United States Patent [19]

Brookins

[11] Patent Number: 5,910,190
[45] Date of Patent: Jun. 8, 1999

[54] TRANSMISSION AND CLUTCH ASSEMBLY

[76] Inventor: Ernie Brookins, 913 W. Main Ave., West Fargo, N. Dak. 58078

[21] Appl. No.: 08/984,724

[22] Filed: Dec. 4, 1997

[51] Int. Cl.⁶ ...................................................... F16H 3/08
[52] U.S. Cl. ................................ 74/329; 74/325; 74/358; 74/355; 74/15.66; 74/342; 74/343
[58] Field of Search ............................ 74/325, 358, 355, 74/15.66, 342, 343, 321, 329

[56] References Cited

U.S. PATENT DOCUMENTS

| 3,648,546 | 3/1972 | McNamara et al. ...................... 74/745 |
| 4,000,662 | 1/1977 | Wolfe ................................. 74/15.66 X |
| 4,660,425 | 4/1987 | Nerstad et al. ..................... 74/15.66 X |
| 5,381,703 | 1/1995 | Rankin ...................................... 74/329 |
| 5,715,727 | 2/1998 | Janiszewski .............................. 74/325 |
| 5,732,595 | 3/1998 | Brookins .................................. 74/374 |

FOREIGN PATENT DOCUMENTS

| 1100479 | 2/1961 | Germany ................................. 74/342 |
| 787836 | 12/1957 | United Kingdom .................. 74/15.66 |
| 927028 | 5/1963 | United Kingdom .................. 74/15.66 |

Primary Examiner—Khoi Q. Ta
Assistant Examiner—Ha Ho
Attorney, Agent, or Firm—David A. Lingbeck

[57] ABSTRACT

The transmission and clutch assembly including a conventional casing, a slidable input shaft directly engageable to the drive member for high gear, and further including an output shaft which is rotatably engaged in the open end of the input shaft, and further including a countershaft for change speed mode and reverse speed, a reverse speed shaft, a clutch housing, a clutch shaft connected to the clutch housing, a pair of pressure members, and a throw-out bearing for change speed mode including reverse speed. This transmission and clutch assembly does not use any internal oil pressure to effect changing of gears and substantially reduces the rotating weight of the transmission when the vehicle is in high gear, because the clutch housing, clutch shaft, input gear and pressure members do not rotate when the transmission is in direct drive speed mode unlike other known transmissions.

20 Claims, 4 Drawing Sheets 5,910,190

TRANSMISSION AND CLUTCH ASSEMBLY

BACKGROUND OF THE INVENTION

This invention relations to a transmission and clutch assembly which are primarily used on stock race cars.

Typically, manual transmissions have more than one shaft which are engaged by clutches that are slidable upon the shafts when the gears are being shifted.

One known prior art is a MANUAL TRANSMISSION OF A MOTOR VEHICLE, U.S. Pat. No. 5,392,665, which comprises an input and an output shaft, transmission gears situated between the two shafts, and a pair of synchronizer clutches which have sleeves that slide upon the shafts when the transmission is being shifted.

Another known prior art is a GEARBOX COUNTERSHAFT DECOUPLER, U.S. Pat. No. 5,381,703, which comprises an input shaft with an input gear freely rotatably thereabout, an output shaft with a plurality of output gears mounted thereupon and a countershaft with a countershaft input gear and further comprises selective coupling and decoupling mechanism for eliminating the driving of the countershaft and the change-speed gears thereon when the gearbox is in a direct drive mode.

None of the prior art discloses a transmission and clutch assembly having a slidable split shaft which allows the user to reduce substantially the rotating weight of the transmission shaft when in direct drive speed mode.

SUMMARY OF THE INVENTION

The present invention relates to a transmission and clutch assembly which includes a case, a slidable input shaft and output shaft having a shifting bearing and an output gear mounted about the input shaft, a countershaft rotatably mounted proximate to the input and output shafts and having a first countershaft gear and a second countershaft gear mounted thereabout, a reverse speed shaft having a reverse speed gear mounted thereabout, and a clutch means comprising a clutch housing rotatably mounted about the input shaft, a clutch shaft fixedly attached to the clutch housing, a pair of disks also mounted about the clutch shaft, and a throw-out bearing mounted about the clutch shaft and operated by hydraulic fluid for engaging one disk with the other for change speed modes including reverse speed.

One objective of the present invention is to provide a transmission and clutch assembly which substantially takes off rotating weight off the transmission when in direct drive speed mode thus eliminating some stress otherwise placed upon the transmission and allows the attaining of higher speeds more quickly.

Another objective of the present invention is to provide a transmission and clutch assembly which doesn't use internal oil pressure to engage and disengage the gears, but instead uses external pressure thus substantially preventing the possibility of seal leakage, a major problem with conventional transmission and clutch assemblies.

Yet, another objective of the present invention is to provide a transmission and clutch assembly which transfers power from the clutch shaft to the countershaft for change speed modes including reverse speed.

Further objectives and advantages of the present invention will become apparent as the description proceeds and when taken in conjunction with the accompanying drawings wherein:

DETAILED DESCRIPTION OF THE INVENTION

Figure 1:
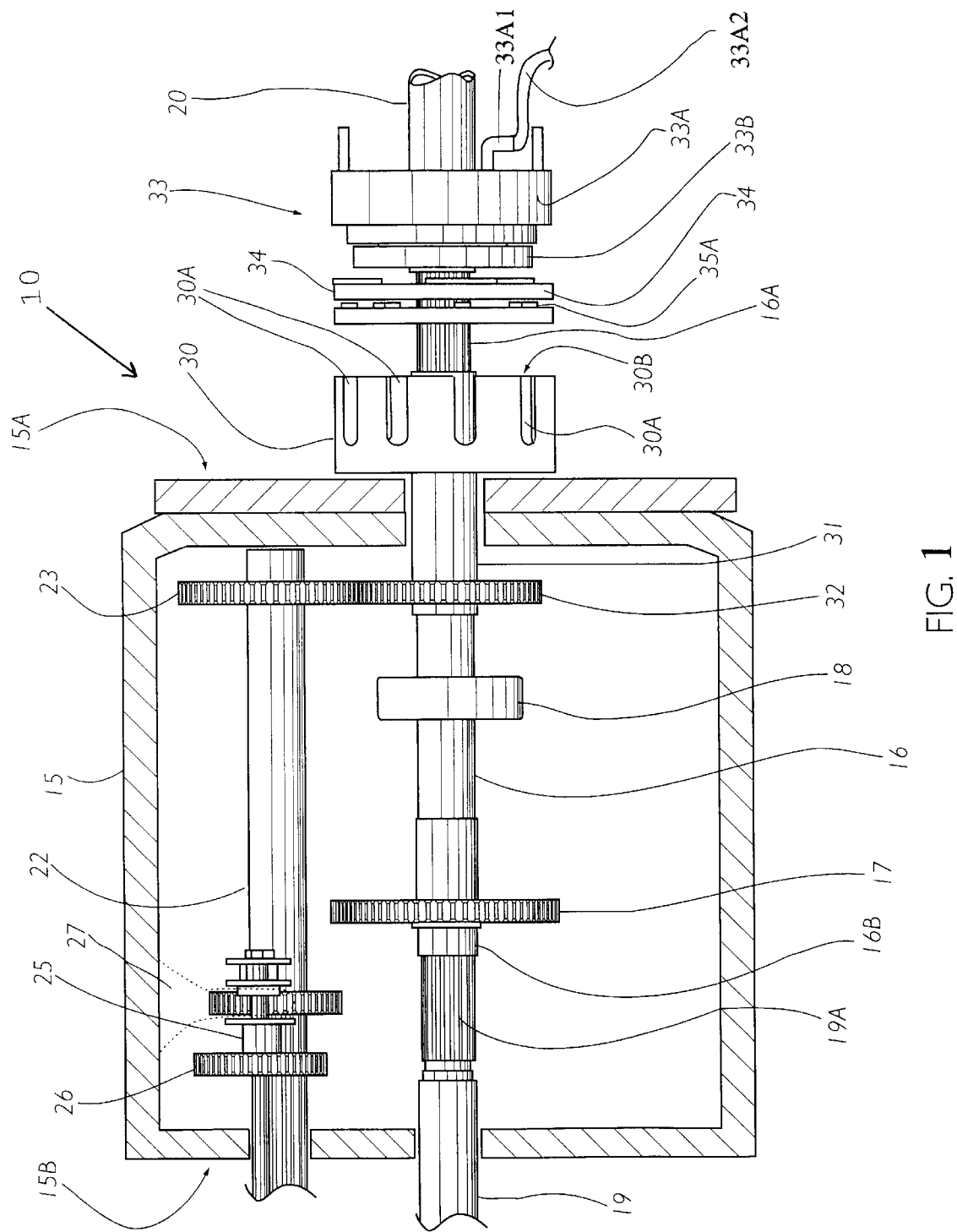
FIG. 1 is a side cross-sectional view of the case showing the disposition of the slidable split shaft with respect to the countershaft when in direct drive speed mode.
Figure 2:
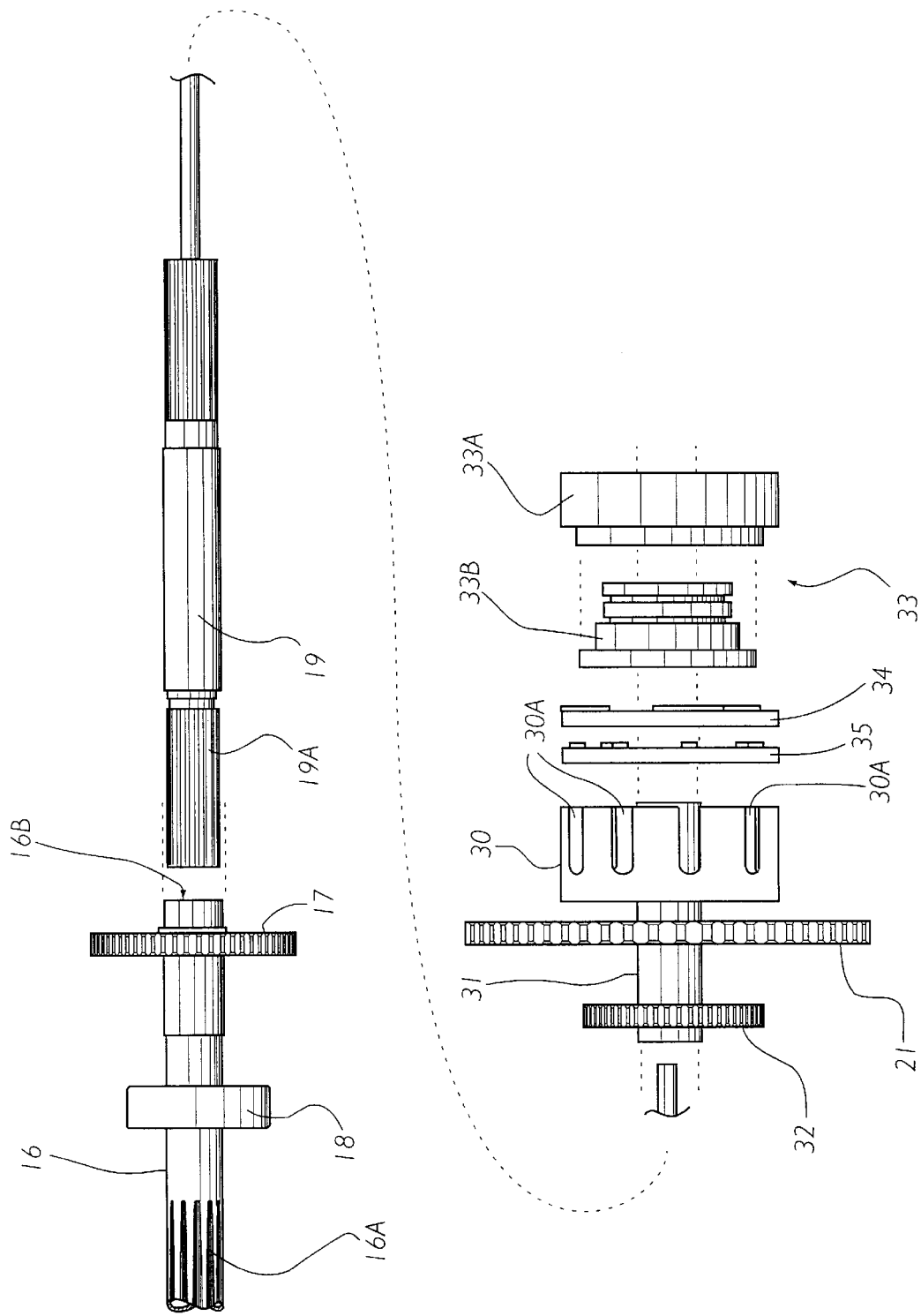
FIG. 2 is a detailed exploded view of the split shaft of the transmission and clutch assembly.

Referring to the drawings in FIGS. 1–4, in particular, the transmission and clutch assembly 10 comprises a conventional casing 15, an input shaft 16 having an open end 16B and a first end 16A rotatably extending through a first end 15A of the casing 15, and having a plurality of splines circumferentially spaced thereabout at the first end 16A thereof and extending longitudinally along a portion thereof for coupling to a drive member 20 of the engine, which is directly connected to the flywheel 21 of the engine, and further having an output gear 17 conventionally mounted thereabout, and also having a shifting bearing 18 conventionally mounted thereabout and connected to a conventional shifting member for sliding the input shaft 16 back and forth. The transmission and clutch assembly 10 also includes an output shaft 19 with a first end 19A adapted to rotatably engage in the open end 16B of the input shaft 16 for rotation therewith or independent thereof and having a plurality of splines circumferentially spaced thereabout and extending longitudinally along a portion thereof, with a second end rotatably extending through a second end 15B of the casing 15 and having a plurality of splines circumferentially spaced thereabout and extending longitudinally along a portion thereof for engaging to the drive train of the vehicle.

The transmission and clutch assembly 10 further includes a countershaft 22 conventionally mounted proximate and parallel to the slidable input shaft 16 and having ends rotatably extending through the casing 15 and further having a first gear 23 conventionally mounted thereabout near a first end thereof and also having a second gear 24 conventionally mounted thereabout near a second end thereof. A reverse speed shaft 25 is rotatably mounted proximate and parallel to both the slidable input shaft 16 and the countershaft 22 and has one end rotatably extending through a forged shaft support member 27 extending inside the casing 15 and has the other end rotatably extending through the casing 15 with a reverse gear 26 being conventionally mounted about the reverse speed shaft 25, the reverse speed shaft 25 being movable by a conventional shifting means to receive reverse speed.

The transmission and clutch assembly 10 further includes a clutch means comprising a clutch housing 30 having an annular wall with a plurality of notches 30A circumferentially spaced thereabout and further having an end wall with a clutch shaft 31 coaxially extending therethrough with an input gear 32 conventionally mounted thereabout. The clutch shaft 31 rotatably extends through the end wall of the casing 15 and has a bore 31A extending therethrough, the bore 31A being adapted to rotatably receive at least a portion of the slidable input shaft 16 and being adapted such that the clutch housing 30 and the clutch shaft 31 can freely rotate about the slidable input shaft 16. Further, the clutch means comprises a pair of pressure members 34,35 such as disks disposed through the open end 30B of the clutch housing 30 with the first friction member being securely attached to the drive member 20 for rotation therewith and the second friction member being freely rotatable about the drive member 20 and having a plurality of lugs extending radially outwardly from and spaced about the circumference of the disk and extending through the notches 30A of the clutch housing 30 for engagement therein. For change speed mode including reverse speed, the two disks are brought into direct contact or coupled with one another by means of a throw-out bearing 33 which comprises an outer tubular race member and an axially-movable inner race member 33B, the outer race member 33A having at least one hydraulic fitting 33A1 attached thereto and attached to a hose 33A2 which is connected to a conventional hydraulic fluid source which supplies hydraulic fluid to and through the outer race member 33A, the fluid being used to urge the inner race member 33B axially into engagement with the first disk 34 which engages the second disk 35; whereupon, the second disk 35 rotates with the first disk 34 which rotates with the drive member 20, and rotates the clutch housing 30 and the gear mounted about the clutch shaft 31. Conventional seal means such as O-rings are used to prevent any fluid leakage between the inner and outer race members 33A,33B.

Figure 3:
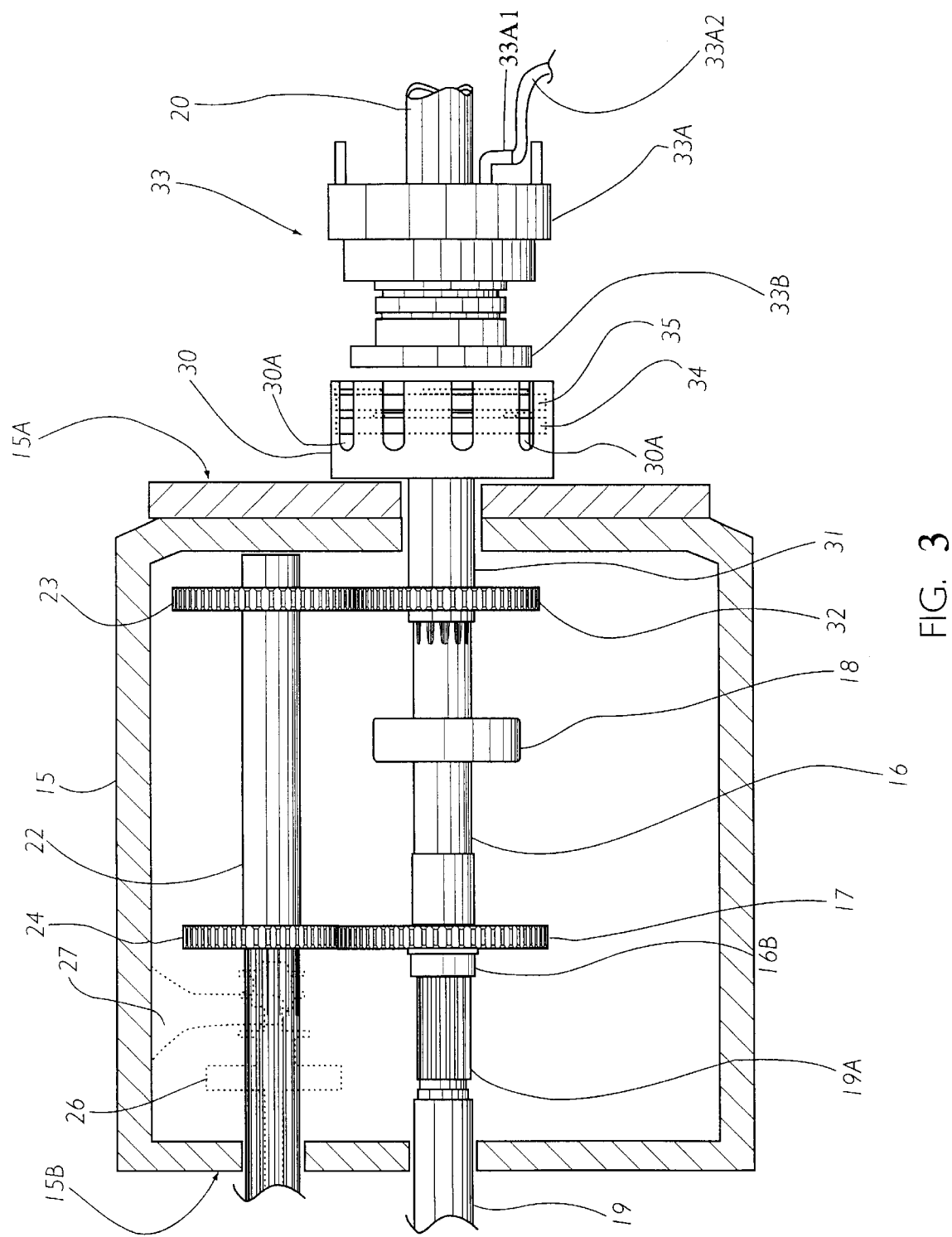
FIG. 3 is a side cross-sectional view of the case showing the disposition of the slidable split shaft with respect to the countershaft when in change speed mode.
Figure 4:
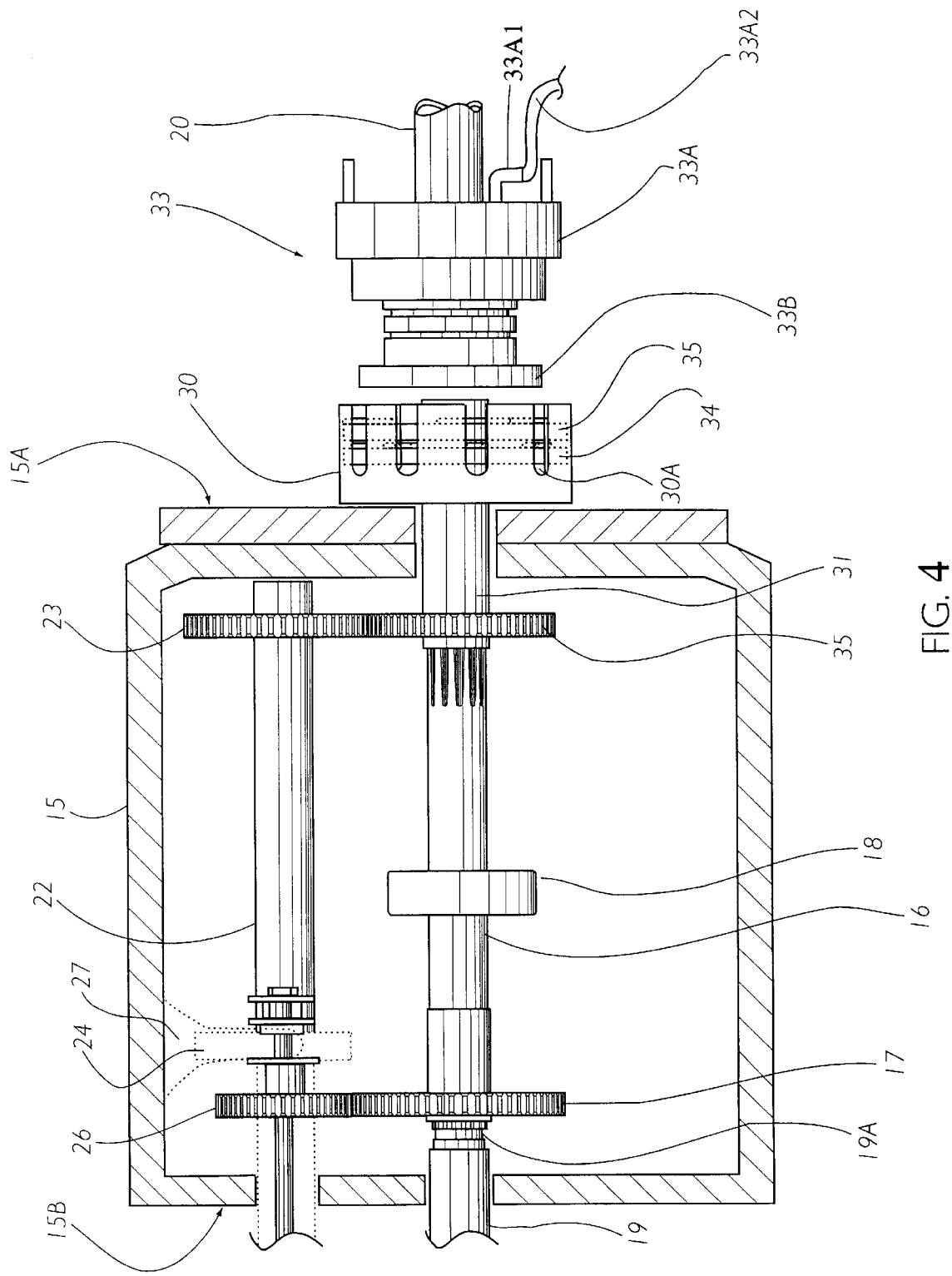
FIG. 4 is a side cross-sectional view of the case showing the disposition of the slidable split shaft and the second shaft with respect to the countershaft when in reverse speed mode.

As shown in FIGS. 3–4, the engine of the vehicle delivers its power to the transmission by means of a conventional rotating drive member 20 which is connected to the engine's flywheel 21. For high speed or direct drive speed mode, the user shifts from inside the passenger compartment of the vehicle the conventional shifting mechanism which slides or moves the slidable input shaft 16 into the drive member 20 with the plurality of splines at the first end 16A of the input shaft 16 engaging the plurality of keyways inside the drive member 20. The slidable input shaft 16 is in direct drive with the drive member 20 and the RPM of the drive member 20 is virtually the same as the RPM delivered through the input shaft 16 to the output shaft 19 and drive train which drive the wheels of the vehicle. Alternatively, instead of the flywheel 21 to the engine being connected directly to the engine, the flywheel 21 is securely mounted to and about the clutch shaft 31 and is started by a conventional starter means which starts the engine. But once the engine is started, the flywheel 21 will not rotate when the transmission is in high speed or direct drive speed mode because the flywheel 21 is mounted directly to the clutch shaft 31 which does not rotate, thus lessening the rotating weight substantially such that for every pound of rotating weight taken off the transmission, forty pounds of weight is taken off the vehicle, thus allowing the vehicle to attain high speed more quickly.

For low speed and overdrive or change speed mode, the user depresses the clutch pedal inside the vehicle which urges hydraulic fluid from the fluid source through the hose 33A2 connected to a fitting 33A1 to the outer race member 33A of the throw-out bearing 33 and through the outer race member 33A and against the inner race member 33B which is urged axially outwardly relative to the outer race member 33A and which urges the first disk 34 into engagement or contact with the second disk 35, resulting in the drive member 20 rotating the disks which, in turn, rotate the clutch housing 30, the clutch shaft 31, the input gear 32 mounted on the clutch shaft 31 and the first gear 23 mounted on the countershaft 22 and the countershaft 22 itself. Concurrently, the user shifts the conventional shifting mechanism which slides or moves the slidable input shaft 16 away from and out of engagement with the drive member 20 and slides or moves the output gear 17 mounted on the input shaft 16 into alignment and engagement with the second gear 24, resulting in the rotation of the input shaft 16 and the output shaft 19. The speed at which the output shaft 19 rotates is dependent upon the ratio of the gears used to obtain low speed and overdrive or change speed modes. Alternatively, high speed can be obtained by the user using the clutch means as described above to drive the input shaft 16 which is done so by sliding the splines of the input shaft 16 into direct engagement with keyways (not shown) disposed inside the bore 31A of the clutch shaft 31 which is being driven by the drive member 20 connected to the flywheel 21 of the engine. Instead of the clutch driving the countershaft 22, the clutch means drives the input shaft 16 directly, resulting in high speed or direct drive speed mode.

For reverse speed, the user follows the same procedure for low speed and overdrive and, in addition, moves the second conventional shifting mechanism which slides or moves the reverse speed shaft 25 such that the reverse gear 26 is moved into alignment and engagement with the second gear 24 on the countershaft 22 and the output gear 17 on the input shaft 16, causing the input shaft 16 and the output shaft 19 to rotate counter to the reverse speed shaft 25 and in the same direction as the countershaft 22 which is now in reverse.

For neutral, the user conventionally manipulates the shifting mechanism which moves or slides the slidable input shaft 16 out of engagement with the drive member 20, thus disengaging power to the drive train of the vehicle.

This transmission and clutch assembly 10 doesn't use any internal oil pressure in the transmission to effect changing or shifting of gears. Rather, external pressure from the hydraulic fluid is used to effect the changing or shifting of gears with oil being disposed inside the casing 15 and used specifically for lubrication of the gears and shafts only.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A transmission and clutch assembly comprising:
   a casing;
   a slidable input shaft relative to said casing, having an output gear mounted thereto;
   an output shaft;
   a countershaft rotatably disposed proximate to said input shaft and having first and second gears mounted thereto;
   a reverse speed shaft rotatably disposed proximate to said input shaft and said countershaft and having a reverse gear mounted thereto for rotation therewith for reverse speed; and
   a clutch means comprising a clutch housing, a clutch shaft, an input gear, first and second pressure members, and a throw-out bearing.

2. A transmission and clutch assembly as described in claim 1, wherein for direct drive speed mode, said input shaft is slidably engaged to a drive member.

3. A transmission and clutch assembly as described in claim 2, wherein said input shaft includes a plurality of splines circumferentially spaced about a first end thereof, and further includes an open second end which is adapted to engageably and rotatably receive a first end of said output shaft.

4. A transmission and clutch assembly as described in claim 3, wherein for direct drive speed mode, said plurality of splines at said first end of said input shaft is slidably engaged to the drive member.

5. A transmission and clutch assembly as described in claim 2, wherein for change speed mode including reverse speed, said slidable input shaft is slidably disengaged from the drive member.

6. A transmission and clutch assembly as described in claim 5, wherein said clutch housing includes an annular wall having a plurality of notches circumferentially spaced thereabout.

7. A transmission and clutch assembly as described in claim 6, wherein said throw-out bearing includes a tubular outer race member and an inner race member axially movable relative to said outer race member for urging said pressure members together to obtain low speed and reverse.

8. A transmission and clutch assembly as described in claim 7, wherein said inner race member is slidably disposed about the drive member.

9. A transmission and clutch assembly as described in claim 8, wherein said throw-out bearing also includes a fitting connected to said outer race member for receiving fluid which exerts external pressure upon said inner race member thus effecting outward movement of said inner race member relative to said outer race member for change speed mode including reverse speed.

10. A transmission and clutch assembly as described in claim 9, wherein for change speed mode including reverse speed, said inner race member is in contactable relationship with said first pressure member and urges said first pressure member into contact and engagement with said second pressure member, thus effecting rotation of said second pressure member which effects rotation of said clutch housing and said clutch shaft.

11. A transmission and clutch assembly as described in claim 10, wherein for change speed mode, said clutch shaft rotates said input gear which rotates said first gear with said countershaft and said second gear rotating therewith, said second gear effecting rotation of said output gear, causing said output shaft to rotate at a slower speed than the drive member.

12. A transmission and clutch assembly as described in claim 10, wherein for reverse, said reverse gear on said reverse speed shaft is slidably engaged to said second gear on said countershaft and to said output gear on said input shaft, thus effecting rotation of said output shaft counter to the drive member.

13. A transmission and clutch assembly as described in claim 10, wherein alternatively for high speed, said input shaft is slidably engaged in said bore of said clutch shaft and rotates with said clutch shaft.

14. A transmission and clutch assembly as described in claim 1, wherein said clutch shaft includes a flywheel mounted thereto for rotation therewith.

15. A method of using a transmission and clutch assembly comprising the steps of:
(A) providing a casing, a slidable input shaft having an input gear, an output shaft engageable to said input shaft, a countershaft having first and second gears, a reverse speed shaft having a reverse gear, a clutch means having a clutch housing, a clutch shaft having an input gear, a pair of pressure members, a throw-out bearing, and a drive member; and
(B) sliding said slidable input shaft relative to said drive member.

16. A method of using a transmission and clutch assembly as defined in claim 15, wherein the step of sliding said slidable input shaft further comprises the step of sliding said input shaft into engagement with said drive member for direct drive speed mode.

17. A method of using a transmission and clutch assembly comprising the steps of:
(A) providing a casing, a slidable input shaft having an output gear thereon, an output shaft engageable to said input shaft, a countershaft having first and second gears, a reverse speed shaft having a gear, a clutch means having a clutch housing, a clutch shaft having an input gear, a pair of pressure members, a throw-out bearing having an inner race member, and a drive member;
(B) sliding said slidable input shaft relative to said drive member; and
(C) activating said throw-out bearing.

18. A method of using a transmission and clutch assembly as described in claim 17, wherein the step of activating said throw-out bearing includes the step of engaging said pressure members to one another by using external fluid pressure to move an inner race member of said throw-out bearing which urges one of said pressure members into contact and engagement with other said pressure member, effecting rotation of said countershaft.

19. A method of using a transmission and clutch assembly as described in claim 18, wherein the step of sliding said slidable input shaft includes sliding said slidable input shaft out of engagement with said drive member such that said output gear on said input shaft is engaged with said second gear on said countershaft for change speed mode.

20. A method of using a transmission and clutch assembly as described in claim 18, wherein said step of sliding said slidable input shaft out of engagement with said crankshaft such that said output gear on said input shaft is engaged with said gear on said reverse speed shaft which is engaged to said second gear on said countershaft for reverse speed.

\* \* \* \* \*